(12) United States Patent
Somanath et al.

(10) Patent No.: US 9,628,695 B2
(45) Date of Patent: Apr. 18, 2017

(54) METHOD AND SYSTEM OF LENS SHIFT CORRECTION FOR A CAMERA ARRAY

(71) Applicant: INTEL CORPORATION, Santa Clara, CA (US)

(72) Inventors: Gowri Somanath, Santa Clara, CA (US); Oscar Nestares, San Jose, CA (US); Kalpana Seshadrinathan, Santa Clara, CA (US); Yi Wu, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 28 days.

(21) Appl. No.: 14/660,848

(22) Filed: Mar. 17, 2015

(65) Prior Publication Data

US 2016/0191759 A1    Jun. 30, 2016

Related U.S. Application Data

(60) Provisional application No. 62/097,433, filed on Dec. 29, 2014.

(51) Int. Cl.
*H04N 5/232* (2006.01)
*H04N 13/02* (2006.01)
*H04N 17/00* (2006.01)
*G03B 13/36* (2006.01)

(52) U.S. Cl.
CPC ....... *H04N 5/23212* (2013.01); *H04N 13/025* (2013.01); *H04N 13/0246* (2013.01); *H04N 17/002* (2013.01); *G03B 13/36* (2013.01)

(58) Field of Classification Search
CPC .. H04N 5/2253; H04N 5/2254; H04N 2/2258; H04N 2/23212; H04N 2/247; H04N 17/002; H04N 1/00013; H04N 1/00018; H04N 13/0246; H04N 13/025; G03B 13/36; G03B 43/00; G01M 11/02; G06T 7/0018; G06T 7/002
See application file for complete search history.

(56) References Cited

U.S. PATENT DOCUMENTS

| | | | |
|---|---|---|---|
| 9,185,291 B1 * | 11/2015 | Shabtay | H04N 5/2258 |
| 2004/0056966 A1 * | 3/2004 | Schechner | G06T 7/0018 348/229.1 |
| 2007/0098380 A1 | 5/2007 | Spielberg | |
| 2007/0122129 A1 | 5/2007 | Sakamoto et al. | |
| 2008/0317453 A1 | 12/2008 | Yuyama | |
| 2010/0020178 A1 * | 1/2010 | Kleihorst | G06T 7/002 348/175 |
| 2010/0097443 A1 * | 4/2010 | Lablans | G03B 37/00 348/36 |
| 2012/0169885 A1 | 7/2012 | Wang et al. | |
| 2013/0124471 A1 * | 5/2013 | Chen | H04N 5/23238 707/624 |

FOREIGN PATENT DOCUMENTS

WO    2010149763    12/2010

OTHER PUBLICATIONS

International Search Report and Written Opinion for International Patent Application No. PCT/US2015/062702, mailed on Mar. 8, 2016, 10 pages.

* cited by examiner

*Primary Examiner* — Dennis Hogue
(74) *Attorney, Agent, or Firm* — Green, Howard & Mughal LLP

(57) ABSTRACT

A system, article, and method of lens shift correction for a camera array.

23 Claims, 11 Drawing Sheets

OBTAIN IMAGE DATA OF MULTIPLE CAMERAS WHEREIN AT LEAST ONE OF THE CAMERAS IS TO PERFORM AUTOFOCUS
302

DETERMINE SHIFT PARAMETERS TO SHIFT THE POSITION OF MISPLACED POINTS OF INDIVIDUAL IMAGES OF THE AUTOFOCUS CAMERA AND TO CORRECT POSITIONS DETERMINED BY USING CORRESPONDING POINTS ON IMAGES OF NON-AUTOFOCUS CAMERAS OF THE MULTIPLE CAMERAS
304

WARP THE IMAGES FROM THE AUTOFOCUS CAMERA BY USING THE PARAMETERS TO MODIFY THE POSITIONS OF THE MISPLACED POINTS ON THE IMAGES OF THE AUTOFOCUS CAMERA 306

FIG. 4

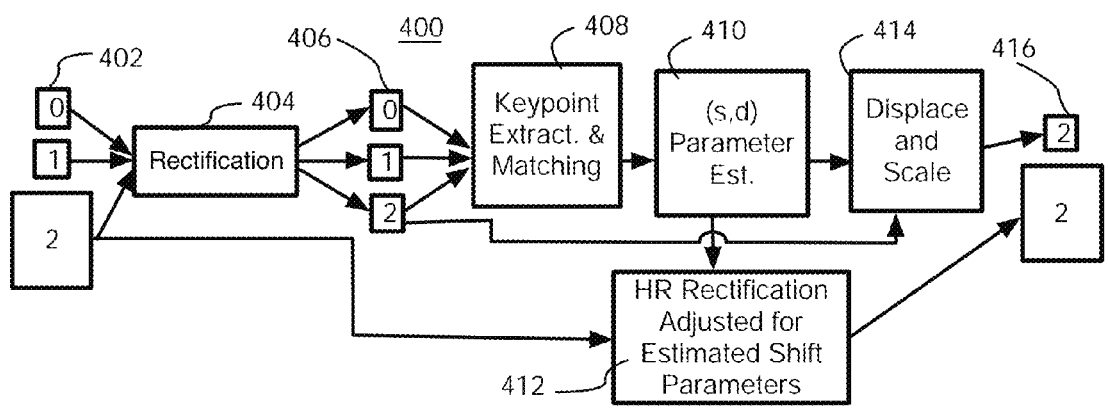

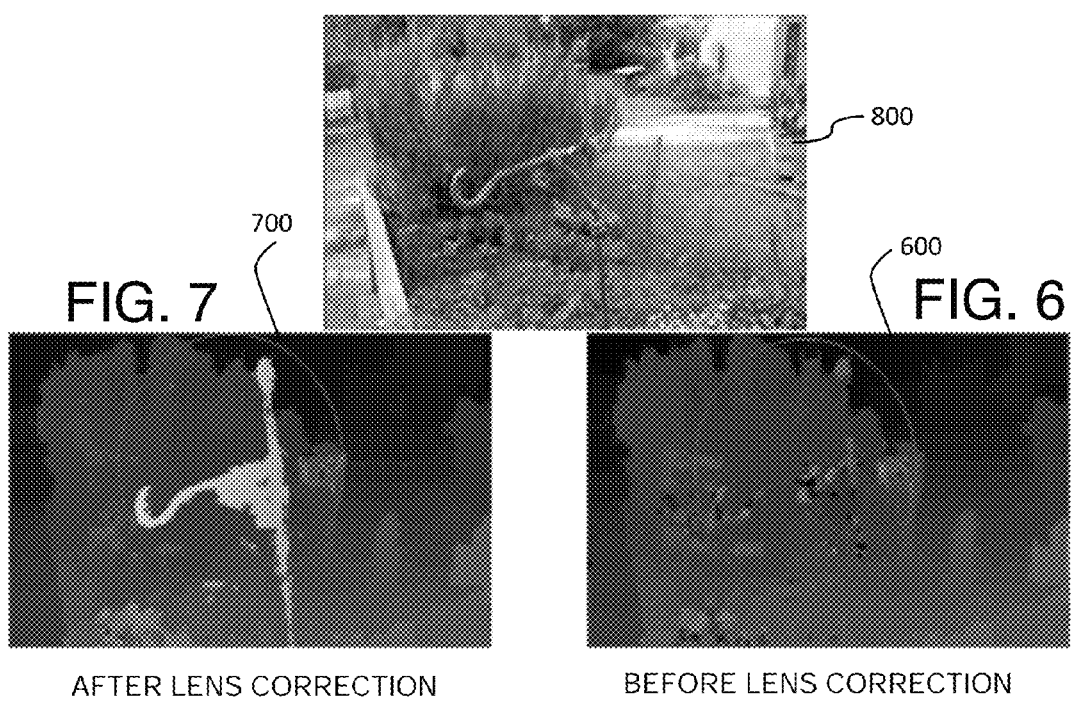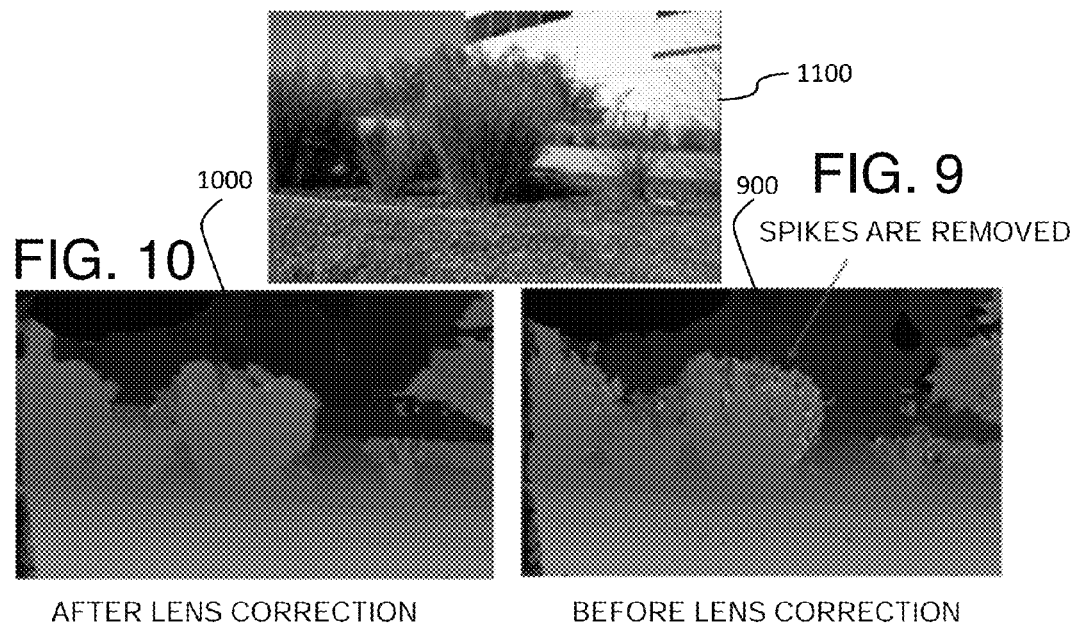

BEFORE LENS CORRECTION
Measured person's ht 265cm, Board width 86cm

AFTER LENS CORRECTION
Measured person's ht 174cm,
Board width 65cm

Actual:
Distance: 6m
Board W: 64cm
Pers. Ht: 175cm

FIG. 14
Before
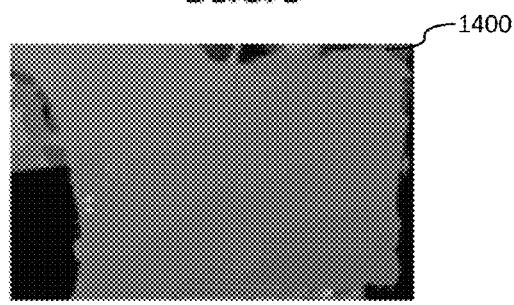
FIG. 15
After lens correction
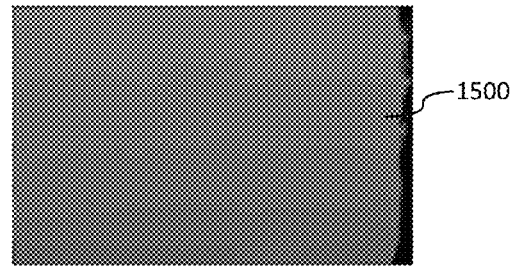
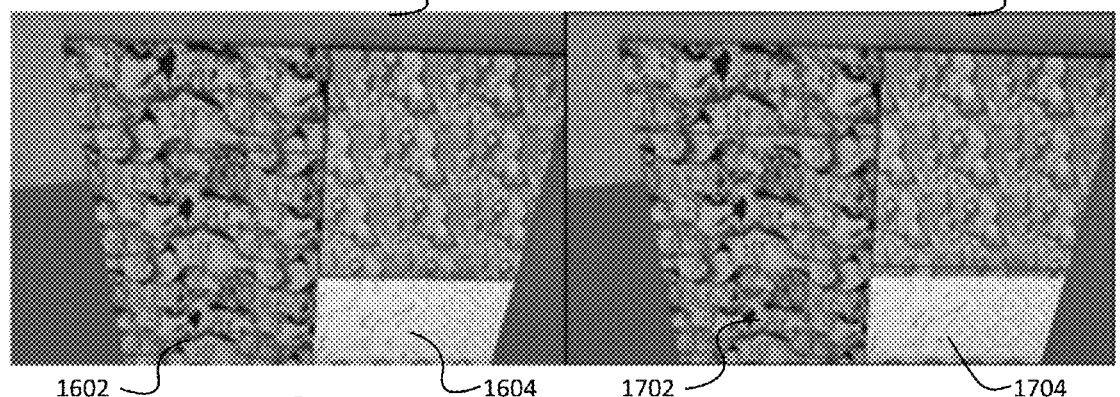
FIG. 16    FIG. 17

METHOD AND SYSTEM OF LENS SHIFT CORRECTION FOR A CAMERA ARRAY

CROSS-REFERENCE TO RELATED APPLICATION

This application claims the benefit of U.S. Provisional Application No. 62/097,433, filed Dec. 29, 2014, which is incorporated herein for all purposes.

BACKGROUND

Digital image processing devices, such as digital cameras, or devices with such cameras, use automatic features to increase the quality of an image on the preview screen on the digital camera, the recorded pictures, and recorded video. This includes the 3A features which refers to automatic white balancing (AWB), automatic focus (AF), and automatic exposure control (AEC). Automatic focus is the automatic adjustment of the lens position relative to an image sensor or other image capture medium to obtain a sharp, clear image.

The movement of the lens is controlled by a camera actuator or motor that converts electric current, in case of a voice coil motor (VCM) actuator, into motion. The position of the lens is linearly proportional to the electric current (in mA) applied. In order to perform calculations to place the lens at a specific position, it must be determined how much electrical current should be applied to move the lens to that position. Due to manufacturing tolerances and/or other errors that can occur during manufacturing of the camera devices and the parts of the camera that hold and move a lens within a camera, a lens may shift relative to the sensor within the camera, and due to gravity or other forces, when the camera is placed in different orientations. This may result in undesirable changes in focal length and principal point from that used for calibration thereby decreasing the quality of captured or recorded images, and in turn, the accuracy of 3D depth detection on devices that provide multiple cameras for such a purpose.

DESCRIPTION OF THE FIGURES

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 3 is a flow chart of a lens correction process for a multi-camera array with autofocus;

FIG. 4 is a flow chart of a lens correction process for a multi-camera array with autofocus;

FIG. 6 is a greyscale disparity map of an image before lens shift correction;

FIG. 7 is a greyscale disparity map of the image of FIG. 6 after lens shift correction;

FIG. 8 is the image used in FIGS. 6-7.

FIG. 9 is a greyscale disparity map of an image before lens shift correction;

FIG. 10 is a greyscale disparity map of the image of FIG. 9 after lens shift correction;

FIG. 11 is the image used in FIGS. 9-10.

FIG. 14 is a another greyscale disparity map of an image before lens shift correction;

FIG. 15 is a greyscale disparity map for the image of FIG. 14 after lens shift correction;

FIG. 16 is a picture showing scaling of the objects in a picture before lens shift correction;

FIG. 17 is a picture showing scaling of the objects in a picture after lens shift correction;

DETAILED DESCRIPTION

Figure 1:
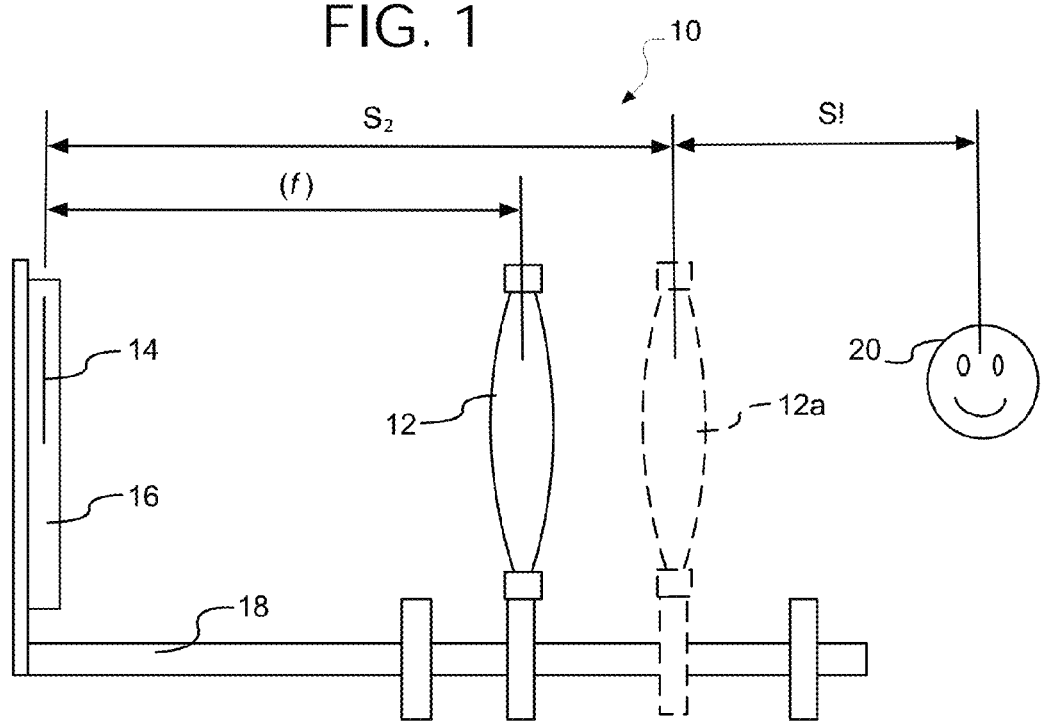
FIG. 1 is a schematic diagram showing the positioning of a lens on an image capture device.

One or more implementations are now described with reference to the enclosed figures. While specific configurations and arrangements are discussed, it should be understood that this is performed for illustrative purposes only. Persons skilled in the relevant art will recognize that other configurations and arrangements may be employed without departing from the spirit and scope of the description. It will be apparent to those skilled in the relevant art that techniques and/or arrangements described herein also may be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as imaging devices, digital cameras, smart phones, webcams, video game panels or consoles, set top boxes, tablets or laptops with multiple cameras, and so forth, may implement the techniques and/or arrangements described herein. Further, while the following description may set forth numerous specific details such as logic implementations, types and interrelationships of system components, logic partitioning/integration choices, and so forth, claimed subject matter may be practiced without such specific details. In other instances, some material such as, for example, control structures and full software instruction sequences, may not be shown in detail in order not to obscure the material disclosed herein. The material disclosed herein may be implemented in hardware, firmware, software, or any combination thereof.

The material disclosed herein may also be implemented as instructions stored on a machine-readable medium or memory, which may be read and executed by one or more processors. A machine-readable medium may include any medium and/or mechanism for storing or transmitting information in a form readable by a machine (for example, a computing device). For example, a machine-readable medium may include read-only memory (ROM); random access memory (RAM); magnetic disk storage media; optical storage media; flash memory devices; electrical, optical, acoustical or other forms of propagated signals (e.g., carrier waves, infrared signals, digital signals, and so forth), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", and so forth, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described herein.

Systems, articles, and methods to provide lens shift correction for a camera array.

As mentioned above, many digital cameras and devices with such cameras provide automatic control features such as the 3A features including automatic focus (AF), automatic exposure control (AEC), and automatic white balance (AWB). Relevant herein, automatic focus (AF) uses calibration algorithms to determine the position of the lens at certain electrical current levels so that the lens can be driven to desired positions by applying a corresponding electrical current. Such features may be provided by a multi-camera device such as a tablet or smartphone or other image capture device that includes an auto-focus mechanism based on a VCM (Voice Coil Motor). Such a device may have a hybrid camera array where the camera modules do not need to be the same. In some examples, at least one camera may have autofocus, while at least two other cameras have fixed focus.

One application of these arrays is to obtain depth data. This may include, for example, defining a 3D space and locating the objects in the picture accurately in the space using the information from the multiple cameras that are providing different points of view of the same real scene. This is achieved by calibrating the camera array during production (factory calibration), which is a process that estimates the intrinsic parameters of each camera (focal length, principal point, geometric distortions, and so forth), as well as the extrinsic parameters (relative 3D rotations and translations, and so forth). This calibration permits the production of so called rectified images where disparity can be computed using a 1D (single dimension) scan line search where lines matching two corresponding points on two images are parallel with the true epipolar line formed by the two rectified images as opposed to the more general 2D search used, for example, in video codecs. With the estimated disparity and the calibration parameters, the system can compute the 3D point for each pixel of the image, which allows for many different applications, including 3D measurement.

As used herein, the true epipolar line is referred to as existing along or on the line from camera to camera centers of two cameras. Thus, for rectified images placed in a common plane, the true epipolar line is represented by the line joining the camera centers. Further, the lines matching corresponding feature points should be parallel to the true epipolar line. Thus, these matching lines may be referred to as a local or matching epipolar line or simply epipolar line instead of stating a line parallel to the true epipolar line. Thus, any mention of epipolar line herein may be to either the true or local epipolar line depending on the context. Also, feature points are interchangeably referred to as keypoints herein.

Referring to FIG. 1, an image capture (or imaging) device 10 is provided such as a camera including a mobile camera such as a dedicated digital camera, camera mounted on a smart phone or a tablet, or many other types of cameras, and that have autofocus features so that the lens or the sensor moves. The image capture device 10 can be considered an optical system which has a moving lens 12 and an imaging plane 14 formed by a sensor 16. The lens 12 is mounted on a lens actuator 18 near the sensor 16. The lens 12 captures the light from an object of interest 20 a distance S1 from the lens, and brings it to focus on the sensor 16. The distance from the imaging plane 14 to the lens 12 when the object is focused to "infinity" is called the focal length or distance (f), and is conventionally specified in millimeters. When the lens is unintentionally shifted to a position 12a (and focused to infinity rather than object 20 as shown) and without intentionally moving the lens to that position with the voice coil motor, the motion changes the focal length to S2 while 3D detection calculations still may be based on focal length (f).

More specifically, when the hybrid array is calibrated, the lens is set to a particular position given by one concrete value in a focus register. In a depth mode, the lens is set to the same position. However, gravitational forces pulling and pushing on the lens when the camera, such as on a tablet for example, is in a different orientation than the one used during calibration which causes the lens to shift in the direction of the optical axis changing the effective focal length (f) as shown in FIG. 1. Another effect for VCM's is that the lens can also shift parallel to the sensor plane (in an out of the paper or up and down on the paper in FIG. 1) due again to different pull/push gravitational forces depending on the module orientation. Thus, the lens is effectively shifting in 3D (parallel and orthogonal to the sensor plane) depending on the orientation of the module, bringing the lens to an uncalibrated state where the focal length and the principal point no longer correspond to the focal length and principal point estimated during calibration. A principal point is the point formed on an image by projecting the optical axis from the center of the senor or camera to the image. By one example, the variation can be as large as 30 pixels for the focal length, and 5 pixels for the principal point, although it might be different for other autofocus lenses.

The solution proposed here to resolve these issues automatically estimates the 2D displacement and the scale of the rectified image for each or individual pictures acquired from the autofocus camera of a camera array with other fixed-focus cameras. Herein, the compensating shift along the Z or optical axis will be referred to as a scale correction, and the shift parallel to the sensor will be referred to as a 2D displacement or simply displacement correction. An autofocus module may use the displacement and scale parameters to recalibrate the lens position to a properly calibrated state so that the next steps (disparity estimation, 3D measurement, and so forth) do not suffer from inaccurate calibration due to lens shift.

Basically, it is assumed that the non-autofocus cameras do not physically move, and that the only effect is that one of the cameras (the one with autofocus) suffers from a potential 3D translation of the lens relative to the sensor, affecting the focal length and principal point. Therefore, it is assumed that the epipolar lines as well as the images from the other non-autofocus cameras do not need to be adjusted and remain properly calibrated. Thus, one principle is to estimate a scale factor and a 2D translation or displacement for the rectified image from the autofocus module, rather than adjusting the images from the fixed cameras, to minimize the rectification error of a set of matched keypoints.

Figure 2:
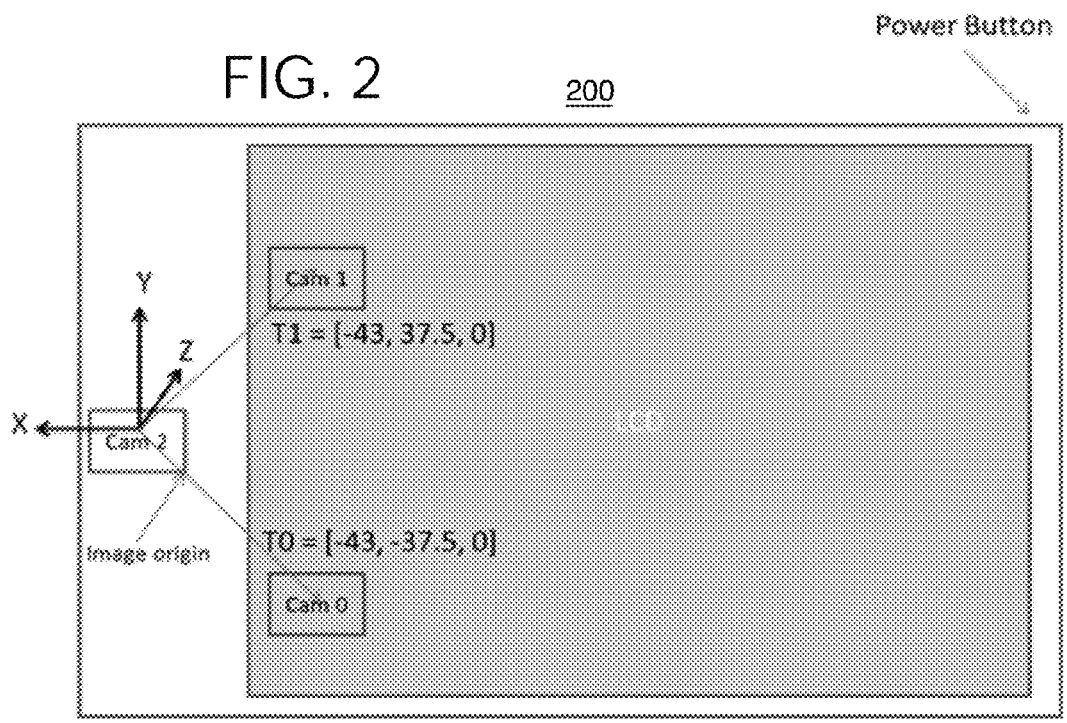
FIG. 2 is a schematic diagram showing a multi-camera array.

Referring to FIG. 2, by one example arrangement that may be used for the lens shift correction methods herein, a multi-camera device 200 has two 720p (which refers to 720 vertical line video display resolution) fixed focus cameras 0 and 1 and one 8 Mp camera with an autofocus lens driven by a VCM. The blocks forming the cameras 0 to 2 on device 200 also represent the relative position and orientation of the images, and camera sensor surfaces, formed by those respective cameras. Camera 0 and 1 are shown to be the same distance from camera 2 but at equal and opposite angles as indicated by the center coordinates of camera 0 and 1. The system and methods disclosed herein, however, will be applicable to other camera arrays provided that there is at least one camera having autofocus resulting in an unstable lens (and by one form for three cameras, only one autofocus camera), and that there are at least two or more non-autofocus (fixed-focus) cameras non-collinear with the autofocus camera. Here, autofocus camera (camera 2) is arranged at the point in a V-shape as shown in FIG. 2. Also, for the process herein, x and y (or displacement) directions are shown to be parallel relative to the camera and camera sensor surfaces, and therefore the images formed by those cameras, while direction z (or scale) is perpendicular to the camera sensor surfaces and images (or in and out of the paper).

One other assumption is that the 720p cameras 0 and 1 are well calibrated, and the 8 Mp camera 2 extrinsics do not change. It is assumed the only changes are due to a lens shift in 3D in the 8 Mp camera due to instability of the VCM which includes the scale shift along the optical axis (Z) causing a different focal length than the one at calibration time, and displacement shift parallel to the sensor plane (XY) that causes a displacement or translation of the principal point with respect to the principal point at calibration time.

Referring to FIG. 3, process 300 is provided for a method of lens shift correction for a camera array. In the illustrated implementation, process 300 may include one or more operations, functions or actions 302 to 306 numbered evenly. By way of non-limiting example, process 300 may be described herein with reference to example image capture devices 10, 200, and 1800 of FIGS. 1, 2, and 18 respectively, and where relevant.

Process 300 may include "obtain image data of multiple cameras wherein at least one of the cameras is to perform autofocus" 302. The image data may be obtained from a single camera array on a device such as a tablet, or may be obtained from multiple cameras on multiple devices where the precise positions of the cameras are known. The image data also may be pre-processed and rectified image data as explained below. Also as mentioned herein, the camera array should have at least one autofocus camera, and at least two fixed-focus cameras.

The process 300 also may include "determine shift parameters to shift the position of misplaced points of individual images of the autofocus camera and to correct positions determined by using corresponding points on images of non-autofocus cameras of the multiple cameras" 304, and specifically to determine the correction needed to apply to the image provided by the autofocus camera. In other words, the scale and displacement parameters indicate a position correction to apply to the image pixel data coordinates forming the image of the autofocus camera and to a properly calibrated position as if the image pixel data were placed by using a focal length, principal point, or both that indicated with the proper calibration. The phrase misplaced point herein simply refers to the points on the image of the autofocus-based camera to differentiate these points from the corresponding matching points on the fixed-focus-based images. Since, by one form, the parameters are applied to all points on the autofocus-based image, all of the points may be considered to be misplaced regardless of whether the point is actually misplaced.

The process 300 may include "warp the image from the autofocus camera by using the parameters to modify the positions of the misplaced points on the images of the autofocus camera" 306. As explained below, the positions may be determined for each, or multiple, images of the autofocus camera for each set of images from the camera array.

Referring to FIG. 4, an example process 400 is provided for a method of lens shift correction for a camera array, and is a block diagram of the method. In the illustrated implementation, process 400 may include one or more operations, functions or actions as illustrated by one or more of operations 402 to 416 numbered evenly. By way of non-limiting example, process 400 may be described herein with reference to example image capture devices 10, 200, and 1800 of FIGS. 1, 2, and 18 respectively, and where relevant.

Process 400 may include obtaining original images (shown as 0 to 2). Image 2 is shown with an enlarged size relative to the other images to represent that image 2 is a high resolution image. Process 400 then may include rectification 404 that produces rectified images 406, and including one from high resolution image 2. The original images are rectified according to the current calibration of the array. Rectification transforms the images into a common plane so that the images may be placed side to side to simplify feature matching.

Process 400 then may include "keypoint extraction and matching" 408. In this operation, keypoints are extracted, and corresponding points on the fixed-focus-based images are matched to misplaced points on the autofocus-based image. The keypoints also may be properly filtered to eliminate false matches for this operation. The keypoints may be first detected by fast retina keypoints (FREAK), binary robust invariant scalable keypoints (BRISK), scale invariant feature transform (SIFT), speed-up robust feature (SURF), or other such detection programs.

Then for matching the keypoints from image to image, typically, keypoints are matched by techniques that match descriptors which may include gradient, greyscale, and/or RGB color values of the points for example, and matched by comparing each point on one image to each point on the other image. Tiled matching, however, includes applications that match keypoints in similar tile positions from image to image so that the whole image does not need to be searched for each keypoint. Specifically, a search area may be restricted to certain blocks of points on one image and near the corresponding location of a point on the other image to be matched, or near a (local) epipolar line from the point to be matched to the other image, or both. Many other conventional methods for matching keypoints are available such as approximate nearest neighbor search, binary search, or brute force one-to-one matching.

Process 400 then may include "(s, d) parameter estimation" 410 to form the displacement and scale parameters for individual images, and in one form, each image of the autofocus camera. The effect of the undesirable lens shift will correspond to a scale factor and displacement (or shift) in XY of the original, unrectified image from camera 2 (8 Mp module). This effect can be approximated by a scale factor and a displacement in XY affecting the rectified image from camera 2 so that the process uses rectified images to estimate the scale factor and 2D displacement as shown in the block diagram of the method in FIG. 4 and as explained in greater detail with process 450 (FIG. 4A) below.

Once the parameters are determined for an image, process 400 then may include "HR rectification adjusted for estimated displacement and scale" 412 to generate a corrected high resolution image 2 by applying the parameters to the pixel image data. Similarly, "displacement and scale" 414 may also be performed to generate a corrected non-high resolution image 2. As mentioned above, displacement refers to the 2D correction that is parallel to the camera sensor. The corrected, rectified images 416 can then be used to perform feature matching with higher accuracy.

Figure 4A:
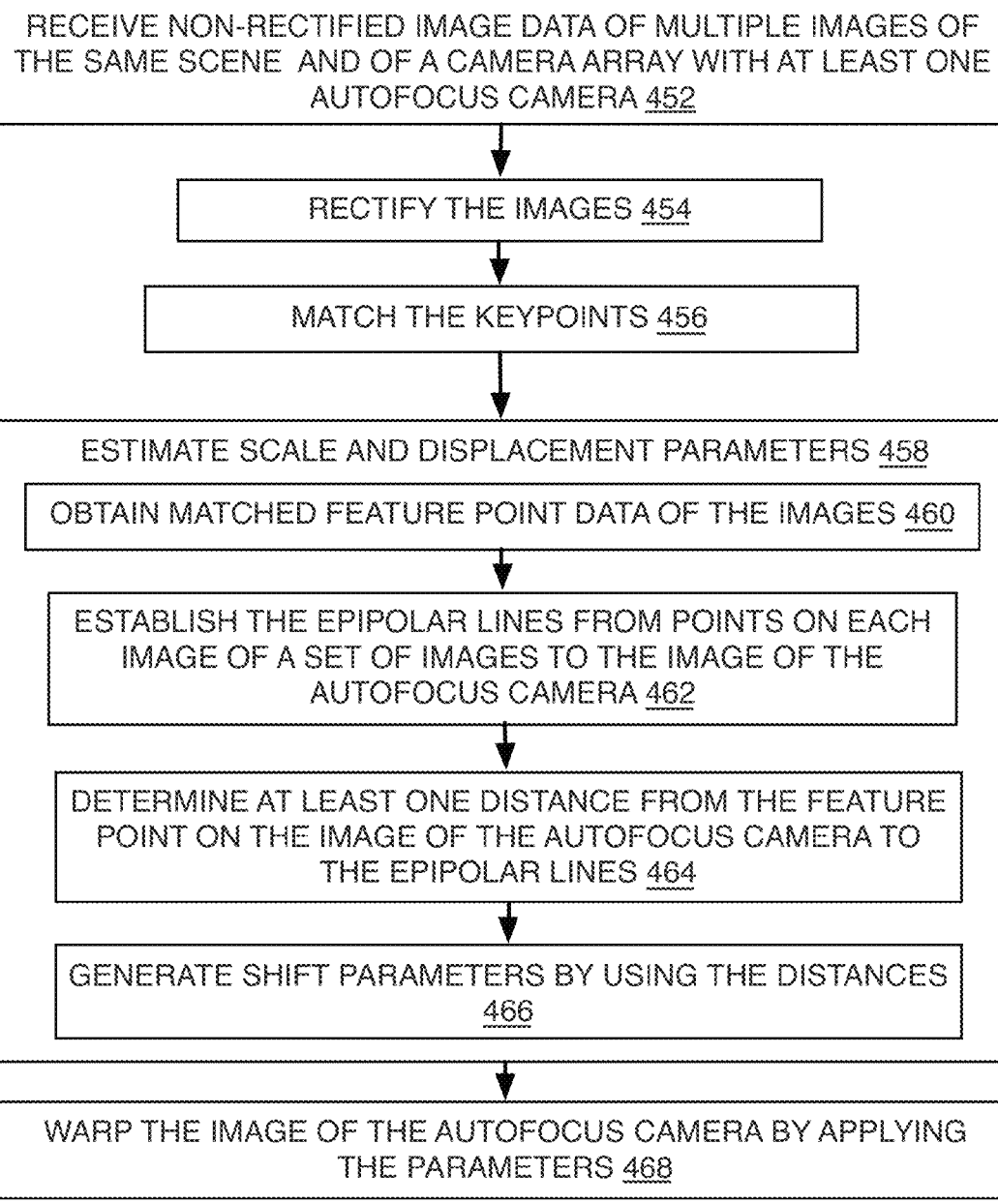
FIG. 4A is a detailed flow chart of a lens correction process for a multi-camera array with autofocus.

Referring to FIG. 4A, a process 450 is provided for a method of lens shift correction for a camera array, and in block diagram form. In the illustrated implementation, process 400 may include one or more operations, functions or actions as illustrated by one or more of operations 452 to 468 numbered evenly. By way of non-limiting example, process 400 may be described herein with reference to example image capture devices 10, 20, and 1800 of FIGS. 1, 2, and 18 respectively, and where relevant.

Process 450 may include "receive non-rectified image data of multiple images of the same scene and of a camera array with at least one autofocus camera" 452. Thus, the image data may be from original images that have not been rectified yet. The images may have already received pre-processing so that the images are ready for rectification though. This may include noise reduction, pixel linearization, shading compensation, resolution reduction, Bayer demosaic, vignette elimination, and/or 3A related operations including automatic white balance (AWB), automatic focus (AF), and/or other automatic exposure (AE), and so forth. This also may include receiving HR resolution images (8 Mp for example) from the autofocus camera and non-high resolution images (720p for example) from the fixed-focus cameras.

This also may include receiving a set of images, or a series of sets of images, with each set having images from a different camera of a camera array where at least one of the images is from an autofocus camera and at least other images are from fixed-focus cameras. The cameras are also arranged in a collinear arrangement so that the fixed-focus cameras can be used in a triangulation type of algorithm to obtain the correct point locations on the autofocus-based image as explained herein.

Process 400 then may include "rectify the images" 454, and as explained above. This results in all three images being transformed to a common plane to simplify the feature point matching from image to image.

Process 400 may include "match the keypoints" 456. This operation may include detecting and extracting keypoints, and then finding keypoint matches across the images as already explained above.

Figure 5:
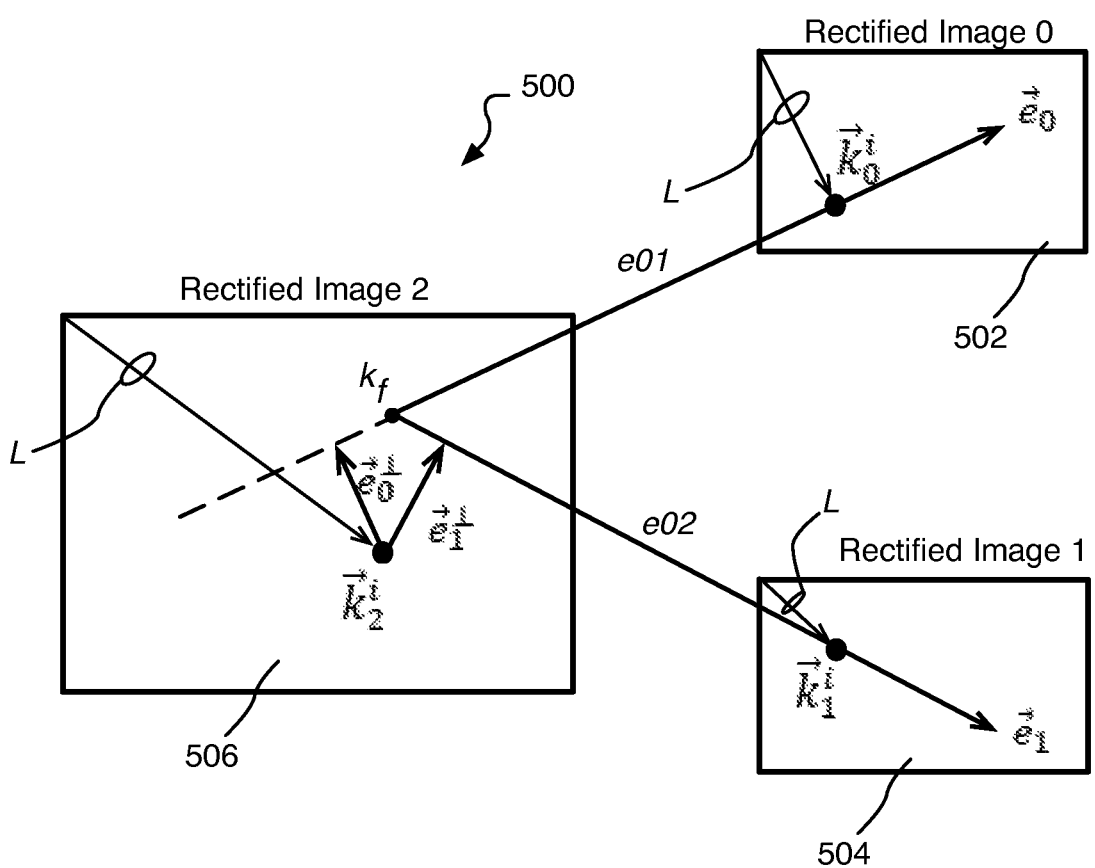
FIG. 5 is a schematic diagram showing the use of multiple rectified images in the lens correction process.

Referring to FIG. 5, and given the set of matched keypoints, the process 400 can then "estimate the scale and displacement parameters" 458. Specifically, this operation attempts to form parameters that minimize the rectification error. Error equations may be inserted into an over-determined linear system so that the shift parameter estimates may be determined from the system. An arrangement of images 500, corresponding to an arrangement of cameras in a camera array such as that on device 200, may be used to explain this process, and has three rectified images 0, 1, and 2 (502, 504, and 506 respectively) in a non-colinear arrangement. Image 2 (506) is enlarged on FIG. 5 for explanatory purposes only and has no relation to the actual size of the image. Three matching points are shown $\vec{k}_0^i$, $\vec{k}_1^i$, and an unintentionally shifted $\vec{k}_2^i$. The desired location for $\vec{k}_2^i$ is at $k_f$. Each or many of the matched feature point pairs may have their own similar arrangement among the images.

It will be understood that the non-collinear arrangement of the cameras, and in turn their respective images, enables the shift parameters to be determined by using a triangulation type of equation since the epipolar lines, such as e01 and e02 on FIG. 5, and from two points on two images of the fixed focus cameras (here 502 and 504) are assumed to be correct, and these two epipolar lines can then be used to form the corrected point $k_f$ on the image 506 of the autofocus camera and that corresponds to the misplaced point $\vec{k}_2^i$ on the image 506. The details are as follows.

The parameter estimation operation may include "obtain matched feature point data of the images" 460. This may include obtaining the image data for misplaced keypoints on autofocus-based image 2, and their corresponding matching keypoints on fixed-focus-based images 0 and 1. The image data may include the coordinates of the points That is each keypoint, has a descriptor used for matching and position (x,y) in the image, where the position is typically described with respect to the top left corner of the image as (0,0). Though in the operation 460, a set of matched keypoints is obtained and in further equations, a keypoint representation can be taken to mean its location (x,y) in the image.

$$\text{Matching keypoints} = \{\vec{k}_0^i, \vec{k}_1^i, \vec{k}_2^i\} \tag{1}$$

The rectification error may be defined as the orthogonal distance to the epipolar lines from the matched keypoints, and determined by using the matched keypoint set (equation (1)), as shown by the following rectification error equations to estimate scale and displacement parameters $\{s, \vec{d}\}$:

$$E_0^i = [(s\vec{k}_2^i + \vec{d} - \vec{k}_0^i) \cdot \vec{e}_0^{195}]^2 \tag{2}$$

$$E_1^i = [(s\vec{k}_2^i + \vec{d} - \vec{k}_1^i) \cdot \vec{e}_1^{195}]^2 \tag{3}$$

where $E_0^i$ is the rectification error between the feature points $\vec{k}_0^i$ and $\vec{k}_2^i$, and $E_1^i$ is the rectification error between feature points $\vec{k}_1^i$ and $\vec{k}_2^i$, $\vec{e}_0^\perp$ and $\vec{e}_1^\perp$ are the unit vector orthogonal distances from the misplaced point to the epipolar lines e02 and e01. As shown in FIG. 5, the unit vectors along the epipolar line are indicated as $\vec{e}_0$ and $\vec{e}_1$. It will be understood that the error equations (2) and (3) are least square type of equations, and alternatives could be weighted error equations.

The minimization of the error may be stated as:

$$\{s, \vec{d}\} = \mathrm{argmin}_{\{s,\vec{d}\}} \Sigma_i (E_0^i + E_1^i) \quad (4)$$

The parameters may be solved in an over-determined linear system, and that in one example form, uses matrix multiplication as in the following equation:

$$\begin{pmatrix} \vdots & \vdots & \vdots \\ \vec{k}_2^i \cdot \vec{e}_0^\perp & e_{0_x}^\perp & e_{0_y}^\perp \\ \vec{k}_2^i \cdot \vec{e}_1^\perp & e_{1_x}^\perp & e_{1_y}^\perp \\ \vdots & \vdots & \vdots \end{pmatrix} \begin{pmatrix} s \\ d_x \\ d_y \end{pmatrix} = \begin{pmatrix} \vdots \\ \vec{k}_0^i \cdot \vec{e}_0^\perp \\ \vec{k}_1^i \cdot \vec{e}_1^\perp \\ \vdots \end{pmatrix} \quad (5)$$

where $e_{0_x}^\perp$ and $e_{0_y}^\perp$ are the x and y components of the orthogonal distance $\vec{e}_0^\perp$ to the epipolar line from image 0, and similarly for $\vec{e}_{1_x}^\perp$ from image 1. Each row in the matrix in equation (5) is provided for each epipolar line from a corresponding point on a fixed-focus-based image (here images 0 and 1). Thus, two or more rows may be associated with a single misplaced point on the autofocus-based image 2 and that has matching corresponding points form the other images.

The next operation may be to "establish the epipolar lines from points on each image of a set of images to the image of the autofocus camera" 462. As mentioned, the epipolar line here is from a corresponding point on the image of the fixed focus camera to a correct matching point on the image of the autofocus camera. The epipolar line extends parallel to the true epipolar line that is the center-to-center of images (or camera sensors), and the matching point must fall on this line. Thus, the misplaced point on the image of the autofocus camera may be corrected by shifting it to the intersection $k_f$ of the multiple epipolar lines from the corresponding points on the other images and extending to the image of the autofocus camera.

The operation 458 then may include "determine at least one distance from the feature point on the image of the autofocus camera to the epipolar lines" 464, and particularly, to form orthogonal epipolar vectors from the misplaced point to the epipolar lines. These distances then may be used to determine the parameters by using the distances to populate the equation. The distances are the 2D correction from the misplaced point $\vec{k}_2^i$ to the corrected point $k_f$ by the example of camera array and image arrangement 500.

Once all of the feature point data and orthogonal epipolar line distances are obtained, this operation then may include "generate shift parameters by using the orthogonal distances" 466, and particularly, to determine the scale s parameter and displacement dx and dy parameter. By one form, this includes solving the populated over-determined linear system by matrix multiplication to estimate the parameters $\{s, \vec{d}\}$. Ultimately, the result is one set of final parameters that minimize the rectification errors $E_0^i$ and $E_1^i$, and will be applied to all of the points in the autofocus-based image for correction of the image.

Once the shift parameters are estimated, process 450 may include "warp the image of the autofocus camera by applying the parameters" 468. Particularly, the rectified image from camera 2 is adjusted by warping it according to the estimated scale and displacement. By one form, each of the points are adjusted by factoring in both scale s and displacement dx and dy values, and by using a 2×3 affine transform warping matrix as follows:

$$\begin{bmatrix} s & 0 & dx \\ 0 & s & dy \end{bmatrix} x \begin{bmatrix} \vec{k}_{2_x}^i \\ \vec{k}_{2_y}^i \end{bmatrix} = \begin{bmatrix} k_{f_x} \\ k_{f_y} \end{bmatrix} \quad (6)$$

which provides final corrected point $(k_{f_x}, k_{f_y})$ on autofocus-based image 2.

By another option, a high-resolution rectified image from camera 2 also can be obtained by adjusting the rectifying transform to account for the estimated scale and displacement. This may be accomplished by integrating the estimated parameters into the rectification transform for that image and applying a single warping step.

These operations may be repeated for each image of the autofocus camera (or in other words, each set of images from the multiple cameras), or some other interval such as every nth image.

Referring to FIGS. 8-17, resulting images from tests are shown. Some qualitative (disparity maps in greyscale) and quantitative (measurements of objects with known dimensions) results are provided. The images were acquired with a tablet device with multiple cameras similar to that shown on FIG. 2.

Referring to FIGS. 6-8, greyscale disparity maps 600 and 700 (for before and after lens shift correction respectively) are shown in FIGS. 6-7 for the image 800 of FIG. 8 with much improved accurate variation in greyscale after the lens shift correction with greatly reduced artifacts.

Referring to FIGS. 9-11, greyscale disparity maps 900 and 1000 (for before and after lens shift correction respectively) are shown in FIGS. 9-10 for the image 1100 of FIG. 11 also with much improved accurate variation in greyscale after the lens shift correction with greatly reduced artifacts.

Figure 12:
FIG. 12 is a comparison of scaling accuracy for objects in an original and scaled picture before lens shift correction.
Figure 13:
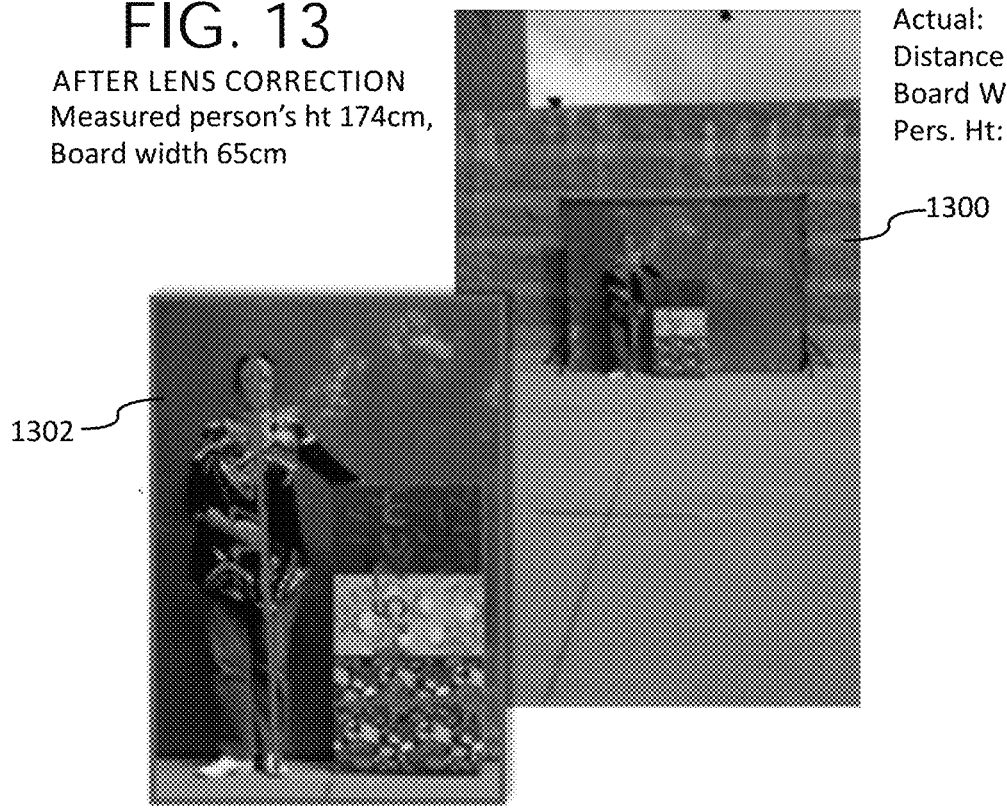
FIG. 13 is a comparison of scaling accuracy for objects in an original and scaled picture after lens shift correction.

Referring to FIGS. 12-13, scaling from an original image 1200 to a close-up image 1202 before lens shift correction is shown, while scaling from an original image 1300 to a close-up image 1302 after lens shift correction is shown. Images 1200 and 1202 show a board width and person height of 86.12 cm and 265.40 cm respectively and measured automatically by the image processing systems of a tablet capturing the images, while images 1300 and 1302 show the same board width and person height measured at 64.57 cm and 174.46 cm respectively. The actual measured width and height are 64 cm width of the board, and 175 cm height of the person. The pictures were taken from a distance of 6 m.

Referring to FIGS. 14-15, greyscale disparity maps 1400 and 1500 (for before and after lens shift correction respectively) of an image are shown and with much reduced artifacts in the after lens correction picture 1500.

Referring to FIGS. 16-17, scaled images 1600 and 1700 for respectively before and after lens shift correction are compared to actual measurement values. Here, two boards 1602 and 1604 have widths of 58 cm and 70 cm before lens shift correction. While the same boards 1702 and 1704 on image 1700 have respective widths of 65 cm and 62 cm after lens shift correction. The actual measurements are 64 cm and 61 cm respectively.

It will be appreciated that while the methods herein are described with the use of a camera array on a single device, such as a tablet, the methods may be applied to multi-camera arrays that are not on a single device as long as the positions of the cameras relative to each other are precisely known.

Figure 21:
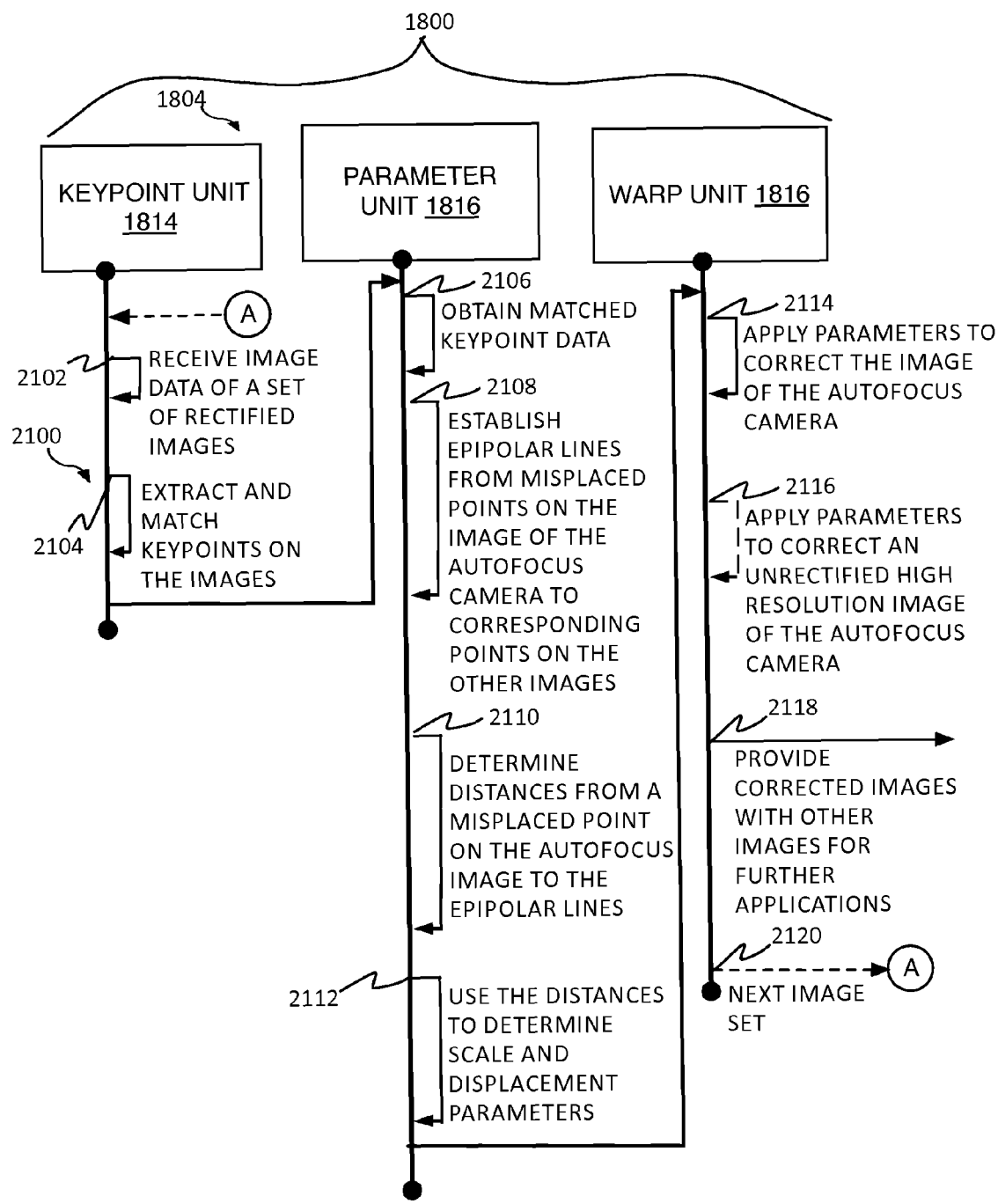
FIG. 21 is a diagram of a method of lens shifting correction in operation and in accordance with at least one of the implementations herein.

Referring to FIG. 21, by another approach, process 2100 illustrates the operation of an image processing system 1800 that performs lens shift correction in accordance with at least some implementations of the present disclosure. In more detail, in the illustrated form, process 2100 may include one or more operations, functions or actions as illustrated by one or more of actions 2102 to 2120 numbered evenly. By way of non-limiting example, process 2100 will be described herein with reference to FIG. 18. Specifically, system or device 1800 includes logic units 1804 that includes a rectification unit 1813, a keypoint unit 1814, and a lens shift correction unit 1812. The lens shift correction unit 1812 has a shift parameters unit 1815 and a warp unit 1816. The operation of the system may proceed as follows.

The process 2100 provides the performance of a lens shift correction algorithm as described above and that corrects a lens shift in an autofocus camera of an array of cameras. The correction is performed by determining shift parameters to apply to the points of the image of the autofocus camera, and by using the points from the images of the other cameras in the array to compute the shift parameters. The images of the autofocus camera then may be warped by the shift parameters to a properly calibrated condition.

Thus, process 2100 may include "receive image data of a set of rectified images" 2102. As mentioned above, the rectified images may be taken by a non-collinear camera array where at least one of the cameras uses autofocus, and at least two other cameras are fixed focus cameras. The raw data images are rectified and from a set of images all taken of the same scene, which may or may not be taken at the same time.

Process 2100 may include "extract and match keypoints on the images" 2104. Also as mentioned above, keypoints may be detected, and then matched image to image. This may be performed using the ketpoint descriptors and matching techniques as described above.

Process 2100 may include "obtain matched keypoint data" 2106. This operation may include obtaining the coordinates of the misplaced points on image 2 of the autofocus camera and the corresponding coordinates of the matched keypoints on the images of the fixed-focus cameras.

Process 2100 may include "establish epipolar lines from corresponding points on the images of the fixed focus cameras to a corrected point on the image of the autofocus camera" 2108. Particularly, since the camera array arrangement is known, the angle and direction of the true epipolar lines from image to image are known. Thus, any point on the image of the autofocus camera should lie on the intersection of the local epipolar lines (parallel to the true epipolar lines) from the corresponding points on the images of the fixed focus cameras. Once the epipolar lines are established, then it is possible to determine how much shift is needed to move a misplaced point to the intersection of the lines.

Process 2100 may include "determine distances from a misplaced point on the autofocus image to the epipolar lines" 2110. This operation includes computing the orthogonal distance from the misplaced point to each of the epipolar lines. Each distance also then may be used to determine the x and y component for each distance.

Process 2100 may include "use the distances to determine scale and displacement parameters" 2112. Thus, as shown in equation (5), by one example, using the triangulation relationship, the shift parameters may be determined by attempting to minimize the rectification error in a least squares equation that is placed in an over-determined linear system that uses matrix multiplication. Other examples are possible. The distances and point values may be inserted into equation (5) for all of the keypoints on the image of the autofocus camera. The result is a scale s parameter and displacement d (or dx and dy) parameter for each image.

Process 2100 may include "apply parameters to correct the image of the autofocus camera" 2114. Thus, the shift parameters may be applied to the keypoints, or all points, in the image of the autofocus camera, and applied to the rectified image of the autofocus camera. This may include using the 2×3 affine transform warping discussed above to factor both scale and displacement in calculating a final corrected point on the autofocus-based image.

Optionally, process 2100 may include "apply parameters to correct an unrectified high resolution image of the autofocus camera" 2116. Thus, the shift parameters may be applied to some or all points of a high resolution image from the autofocus camera as well.

Process 2100 may include "provide corrected images with the other images for further applications" 2118. Specifically, the set of images then may be handed over to other applications that may determine a disparity map that indicates the pixel change in position from image to image for a point, and/or form a 3D depth map to measure distances and/or identify objects in a 3D space formed by using the images. Other applications are mentioned above.

Process 2100 may include "next image set" 2120. Thus, the present method is applied individually to images, and may be applied to each image, or set of images, that are captured by the camera array. Other alternatives are contemplated as mentioned above.

In addition, any one or more of the operations of FIGS. 3-4A and 21 may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more computer or machine-readable media. In general, a machine-readable medium may convey software in the form of program code and/or instructions or instruction sets that may cause any of the devices and/or systems to perform as described herein. The machine or computer readable media may be a non-transitory article or medium, such as a non-transitory computer readable medium, and may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

As used in any implementation described herein, the term "logic unit" refers to any combination of firmware logic and/or hardware logic configured to provide the functionality described herein. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

Figure 18:
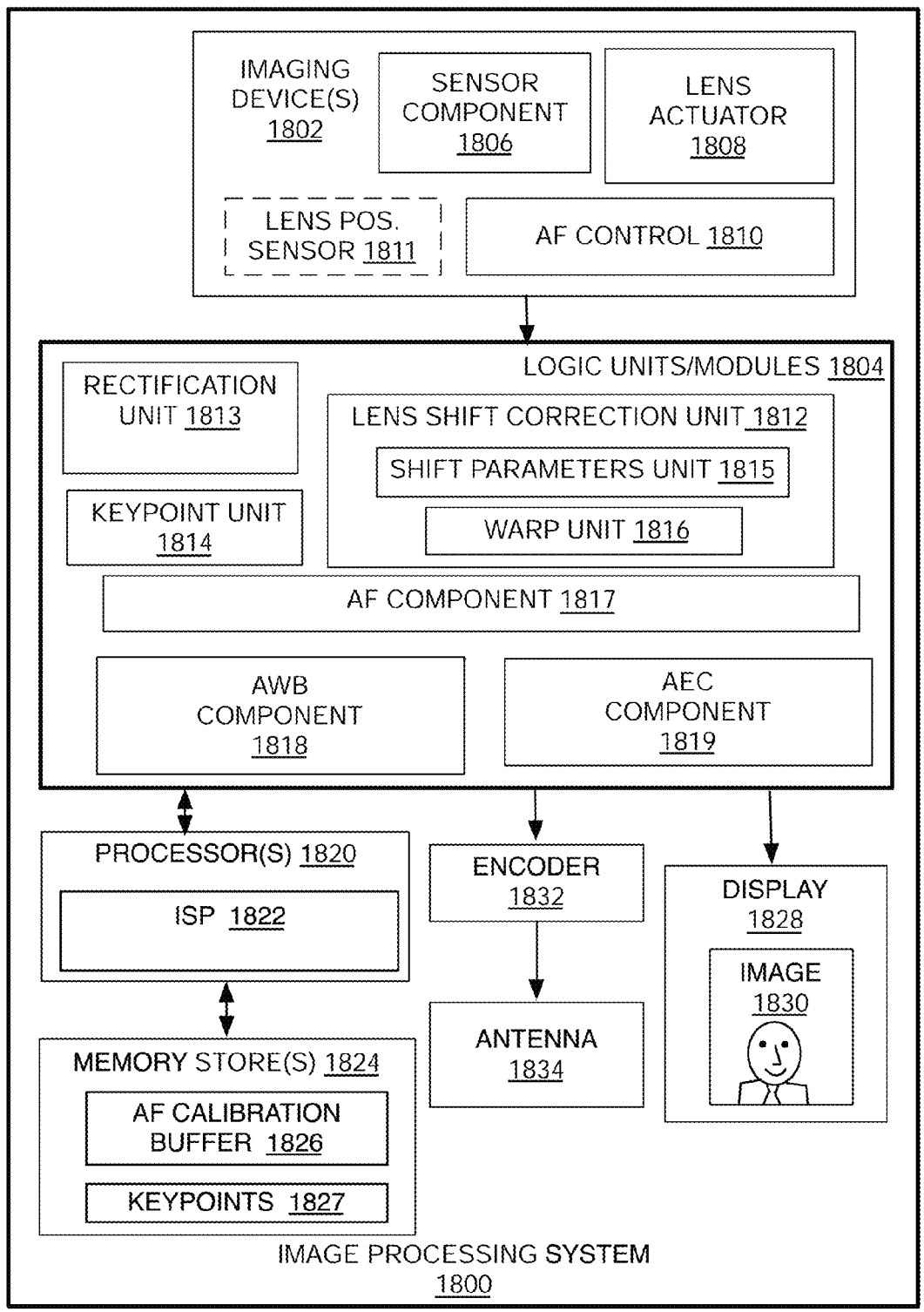
FIG. 18 is an illustrative diagram of an example system.

Referring to FIG. 18, an example image processing system 1800 is arranged in accordance with at least some implementations of the present disclosure. In various implementations, the example image processing system 1800 may have an imaging device 1802 to form or receive captured image data. This can be implemented in various ways. Thus, in one form, the image processing system 1800 may be a digital camera or other image capture device, and imaging device 1802, in this case, may be the camera hardware and camera sensor software, module, or component 1812. In other examples, imaging processing system 1800 may have an imaging device 1802 that includes or may be a camera, and logic modules 1804 may communicate remotely with, or otherwise may be communicatively coupled to, the imaging device 1802 for further processing of the image data.

Thus, image processing device 1800 may be a single camera on a multi-camera device such as a tablet. Otherwise, device 1800 may be the tablet or other device with multiple cameras where the processing occurs at one of the cameras or at a separate processing location communicating with the cameras whether on or off of the tablet.

In either case, such technology may include a camera such as a digital camera system, a dedicated camera device, or an imaging phone or tablet, whether a still picture or video camera, or device with a preview screen, or some combination of these. Thus, in one form, imaging device 1802 may include camera hardware and optics including one or more sensors as well as auto-focus, zoom, aperture, ND-filter, auto-exposure, flash, and actuator controls. These controls may be part of a sensor module or component 1806 for operating the sensor. The sensor component 1806 may be part of the imaging device 1802, or may be part of the logical modules 1804 or both. Such sensor component can be used to generate images for a viewfinder, which may include a preview screen, and take still pictures or video. The imaging device 1802 also may have a lens, an image sensor with a RGB Bayer color filter, an analog amplifier, an A/D converter, other components to convert incident light into a digital signal, the like, and/or combinations thereof. The digital signal also may be referred to as the raw image data herein.

Other forms include a camera sensor-type imaging device or the like (for example, a webcam or webcam sensor or other complementary metal-oxide-semiconductor-type image sensor (CMOS)), without the use of a red-green-blue (RGB) depth camera and/or microphone-array to locate who is speaking. The camera sensor may also support other types of electronic shutters, such as global shutter in addition to, or instead of, rolling shutter, and many other shutter types. In other examples, an RGB-Depth camera and/or microphone-array might be used in addition to or in the alternative to a camera sensor. In some examples, imaging device 1802 may be provided with an eye tracking camera.

The imaging device 1802 also may have a lens actuator 1808 that has a lens and a lens driver or driver logic that receives commands to move the lens and applies an electrical current to move the lens. An autofocus (AF) control 1810 may be provided on the imaging device as well to collect calibration data from sensors and the lens actuator, and to transmit the data to memories and/or the AF component 1812. Optionally, the imaging device 1802 also may have a lens position sensor 1811 to confirm lens positions if needed.

In the illustrated example, the logic modules 1804 may include a rectification unit 1813, a keypoint unit 1814, and a lens shift correction unit 1812 that, in turn, includes a shift parameters unit 1815 and a warping unit 1816 that performs the operations mentioned herein, such as those explained in process 400 and 450. An AF component 1817 may be provide to perform AF algorithms to compute a desired new current lens position, and AF calibration to calculate updated EOC, SOC, and INF values. The logic modules 1804 also may include an automatic white balance (AWB) module 1818, and an automatic exposure control (AEC) module 1819. The components of logic modules 1804 including the lens shift correction unit 1812 may be operated by, or even entirely or partially located at, processor(s) 1820, and which may include an ISP 1822. The logic modules may be communicatively coupled to the components of the imaging device 1802 in order to receive raw image data. Optionally, data may be provided by a data stream separate from the raw image data stream. In these cases, it is assumed the logic modules 1804 are considered to be separate from the imaging device. This need not be so, and the logic modules very well may be considered to be part of the imaging device as well.

The image processing system 1800 may have one or more processors 1820 which may include a dedicated image signal processor (ISP) 1822 such as the Intel Atom, memory stores 1824 which may or may not hold AF calibration buffers 1826 as well as keypoint data 1827 mentioned herein, one or more displays 1828 to provide images 1830, encoder 1832, and antenna 1834. In one example implementation, the image processing system 100 may have the display 1828, at least one processor 1820 communicatively coupled to the display, at least one memory 1824 communicatively coupled to the processor and having buffer 1827 by one example for storing the keypoints or any other lens shift correction data. The encoder 1832 and antenna 1834 may be provided to compress the modified image date for transmission to other devices that may display or store the image. It will be understood that the image processing system 1800 may also include a decoder (or encoder 1832 may include a decoder) to receive and decode image data for processing by the system 1800. Otherwise, the processed image 1830 may be displayed on display 1828 or stored in memory 1824. As illustrated, any of these components may be capable of communication with one another and/or communication with portions of logic modules 1804 and/or imaging device 1802. Thus, processors 1820 may be communicatively coupled to both the image device 1802 and the logic modules 1804 for operating those components. By one approach, although image processing system 1800, as shown in FIG. 18, may include one particular set of blocks or actions associated with particular components or modules, these blocks or actions may be associated with different components or modules than the particular component or module illustrated here.

Figure 19:
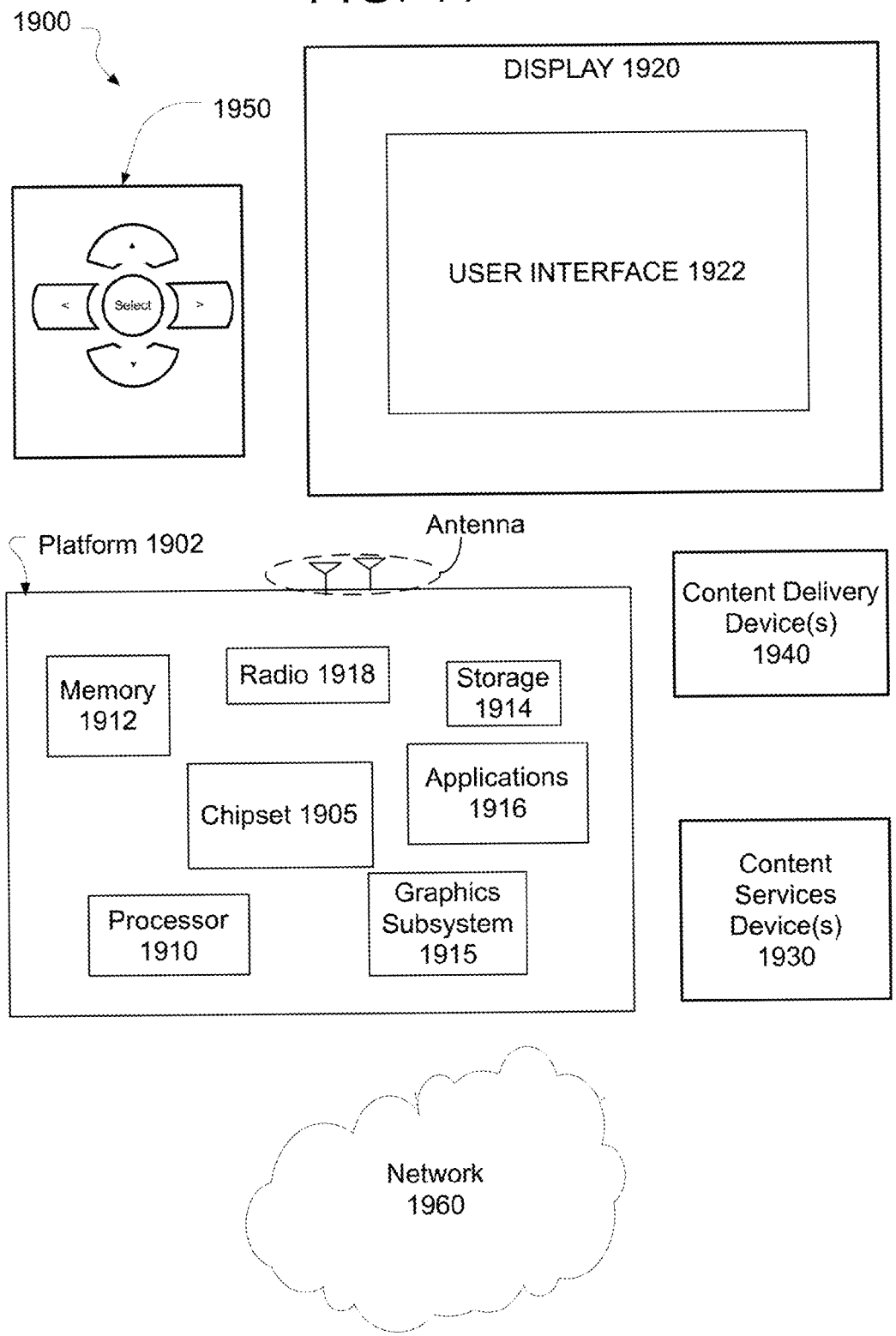
FIG. 19 is an illustrative diagram of another example system.

Referring to FIG. 19, an example system 1900 in accordance with the present disclosure operates one or more aspects of the image processing system 10, 200, or 1800 described herein. It will be understood from the nature of the system components described below that such components may be associated with, or used to operate, certain part or parts of the image processing system described above. In various implementations, system 1900 may be a media system although system 1900 is not limited to this context. For example, system 1900 may be incorporated into a digital still camera, digital video camera, mobile device with camera or video functions such as an imaging phone, webcam, personal computer (PC), laptop computer, ultra-laptop computer, tablet with multiple cameras, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 1900 includes a platform 1902 coupled to a display 1920. Platform 1902 may receive content from a content device such as content services device(s) 1930 or content delivery device(s) 1940 or other similar content sources. A navigation controller 1950 including one or more navigation features may be used to interact with, for example, platform 1902 and/or display 1920. Each of these components is described in greater detail below.

In various implementations, platform 1902 may include any combination of a chipset 1905, processor 1910, memory 1912, storage 1914, graphics subsystem 1915, applications 1916 and/or radio 1918. Chipset 1905 may provide intercommunication among processor 1910, memory 1912, storage 1914, graphics subsystem 1915, applications 1916 and/or radio 1918. For example, chipset 1905 may include a storage adapter (not depicted) capable of providing intercommunication with storage 1914.

Processor 1910 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 1910 may be dual-core processor(s), dual-core mobile processor(s), and so forth.

Memory 1912 may be implemented as a volatile memory device such as, but not limited to, a Random Access Memory (RAM), Dynamic Random Access Memory (DRAM), or Static RAM (SRAM).

Storage 1914 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1914 may include technology to increase the storage performance enhanced protection for valuable digital media when multiple hard drives are included, for example.

Graphics subsystem 1915 may perform processing of images such as still or video for display. Graphics subsystem 1915 may be a graphics processing unit (GPU) or a visual processing unit (VPU), for example. An analog or digital interface may be used to communicatively couple graphics subsystem 1915 and display 1920. For example, the interface may be any of a High-Definition Multimedia Interface, Display Port, wireless HDMI, and/or wireless HD compliant techniques. Graphics subsystem 1915 may be integrated into processor 1910 or chipset 1905. In some implementations, graphics subsystem 1915 may be a stand-alone card communicatively coupled to chipset 1905.

The graphics subsystem 1915 also may be considered to include any of the applications that are, or operate, the camera operations described with system 1800.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1918 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1918 may operate in accordance with one or more applicable standards in any version.

In various implementations, display 1920 may include any television type monitor or display. Display 1920 may include, for example, a computer display screen, touch screen display, video monitor, television-like device, and/or a television. Display 1920 may be digital and/or analog. In various implementations, display 1920 may be a holographic display. Also, display 1920 may be a transparent surface that may receive a visual projection. Such projections may convey various forms of information, images, and/or objects. For example, such projections may be a visual overlay for a mobile augmented reality (MAR) application. Under the control of one or more software applications 1916, platform 1902 may display user interface 1922 on display 1920.

In various implementations, content services device(s) 1930 may be hosted by any national, international and/or independent service and thus accessible to platform 1902 via the Internet, for example. Content services device(s) 1930 may be coupled to platform 1902 and/or to display 1920. Platform 1902 and/or content services device(s) 1930 may be coupled to a network 1960 to communicate (e.g., send and/or receive) media information to and from network 1960. Content delivery device(s) 1940 also may be coupled to platform 1902 and/or to display 1920.

In various implementations, content services device(s) 1930 may include a cable television box, personal computer, network, telephone, Internet enabled devices or appliance capable of delivering digital information and/or content, and any other similar device capable of unidirectionally or bidirectionally communicating content between content providers and platform 1902 and/display 1920, via network 1960 or directly. It will be appreciated that the content may be communicated unidirectionally and/or bidirectionally to and from any one of the components in system 1900 and a content provider via network 1960. Examples of content may include any media information including, for example, video, music, medical and gaming information, and so forth.

Content services device(s) 1930 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1902 may receive control signals from navigation controller 1950 having one or more navigation features. The navigation features of controller 1950 may be used to interact with user interface 1922, for example. In embodiments, navigation controller 1950 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1950 may be replicated on a display (e.g., display 1920) by movements of a pointer, cursor, focus ring, or other visual indicators displayed on the display. For example, under the control of software applications 1916, the navigation features located on navigation controller 1950 may be mapped to virtual navigation features displayed on user interface 1922, for example. In embodiments, controller 1950 may not be a separate component but may be integrated into platform 1902 and/or display 1920. The present disclosure, however, is not limited to the elements or in the context shown or described herein.

In various implementations, drivers (not shown) may include technology to enable users to instantly turn on and off platform 1902 like a television with the touch of a button after initial boot-up, when enabled, for example. Program logic may allow platform 1902 to stream content to media adaptors or other content services device(s) 1930 or content delivery device(s) 1940 even when the platform is turned "off." In addition, chipset 1905 may include hardware and/or software support for 8.1 surround sound audio and/or high definition (7.1) surround sound audio, for example. Drivers may include a graphics driver for integrated graphics platforms. In embodiments, the graphics driver may comprise a peripheral component interconnect (PCI) Express graphics card.

In various implementations, any one or more of the components shown in system 1900 may be integrated. For example, platform 1902 and content services device(s) 1930 may be integrated, or platform 1902 and content delivery device(s) 1940 may be integrated, or platform 1902, content services device(s) 1930, and content delivery device(s) 1940 may be integrated, for example. In various embodiments, platform 1902 and display 1920 may be an integrated unit. Display 1920 and content service device(s) 1930 may be integrated, or display 1920 and content delivery device(s) 1940 may be integrated, for example. These examples are not meant to limit the present disclosure.

In various embodiments, system 1900 may be implemented as a wireless system, a wired system, or a combination of both. When implemented as a wireless system, system 1900 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1900 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1902 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 19.

Figure 20:
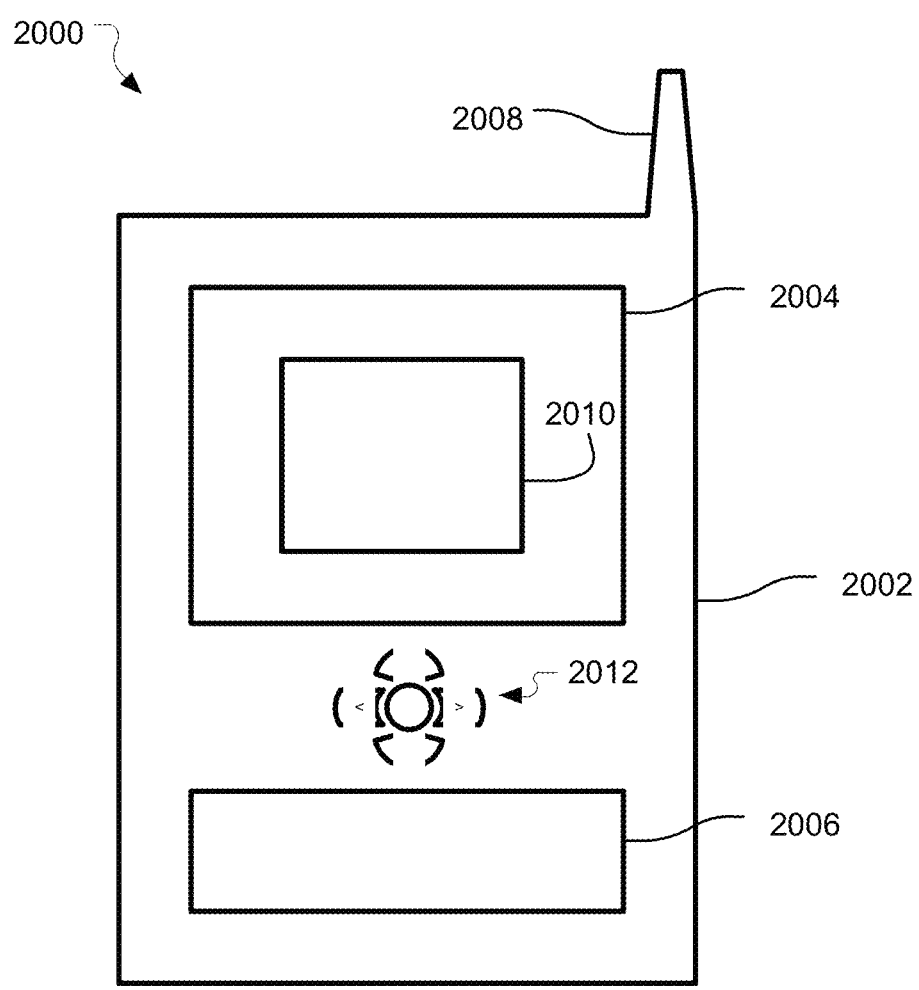
FIG. 20 illustrates another example device, all arranged in accordance with at least some implementations of the present disclosure.

Referring to FIG. 20, a small form factor device 2000 is one example of the varying physical styles or form factors in which system 1800 or 1900 may be embodied. By this approach, device 2000 may be implemented as a mobile computing device having wireless capabilities. A mobile computing device may refer to any device having a processing system and a mobile power source or supply, such as one or more batteries, for example.

As described above, examples of a mobile computing device may include a digital still camera, digital video camera, mobile devices with camera or video functions such as imaging phones, webcam, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth, and any of these as part of, or having, a camera array.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 20, device 2020 may include a housing 2002, a display 2004 including a screen 2010, an input/output (I/O) device 2006, and an antenna 2008. Device 2000 also may include navigation features 2012. Display 2004 may include any suitable display unit for displaying information appropriate for a mobile computing device. I/O device 2006 may include any suitable I/O device for entering information into a mobile computing device. Examples for I/O device 2006 may include an alphanumeric keyboard, a numeric keypad, a touch pad, input keys, buttons, switches, rocker switches, microphones, speakers, voice recognition device and software, and so forth. Information also may be entered into device 2000 by way of microphone (not shown). Such information may be digitized by a voice recognition device (not shown). The implementations are not limited in this context.

Various forms of the devices and processes described herein may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one implementation may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further implementations.

By one example implementation, a computer-implemented method of lens shift correction for a camera array comprises obtaining image data of multiple cameras wherein at least one of the cameras is to perform autofocus; determining shift parameters to shift the position of misplaced points of individual images of the autofocus camera and to correct positions determined by using corresponding points on images of non-autofocus cameras of the multiple cameras; and warping the images from the autofocus camera by using the parameters to modify the positions of the misplaced points on the images of the autofocus camera.

By another implementation, the method may comprise wherein the shift parameters indicate a correction to the misplaced points as if the misplaced points were positioned by using a focal length, principal point, or both that were previously used for a calibration; wherein the parameters are different from image to image of the autofocus camera; wherein the parameters are determined by using an over-determined linear system; wherein the parameters are determined by minimizing a rectification error equation; wherein the error equations are placed in matrix multiplication form with the parameter variables to be determined. The method also may comprise establishing at least two epipolar lines each extending from a corresponding point of a misplaced point and from an image of a non-autofocus camera, and extending to the image of the autofocus camera, wherein the intersection of the epipolar lines on the image of the autofocus camera is the correct position of the misplaced point; determining a distance from the misplaced point to each of the epipolar lines on the image of the autofocus camera; and using the distances to compute at least one of the shift parameters. The method also may comprise wherein the cameras are in a non-collinear arrangement; wherein the shift parameters include a 2D displacement in a direction substantially parallel to a plane of a sensor of the autofocus camera, or scale substantially in a direction of the optical axis of the autofocus camera; and the method comprising at least one of: warping rectified images of the autofocus camera with the parameters; and warping unrectified high resolution images of the autofocus camera with the parameters.

By a further implementation, a computer-implemented system of lens shift correction, comprises a display; at least one processor communicatively coupled to the display; at least one memory communicatively coupled to at least one processor; and a lens shift correction unit operated by the processor and to: obtain image data of multiple cameras wherein at least one of the cameras is to perform autofocus; determine shift parameters to shift the position of misplaced points of individual images of the autofocus camera and to correct positions determined by using corresponding points on images of non-autofocus cameras of the multiple cameras; and warp the images from the autofocus camera by using the parameters to modify the positions of the misplaced points on the images of the autofocus camera.

By yet a further implementation, the system may comprise wherein the shift parameters indicate a correction to the misplaced points as if the misplaced points were positioned by using a focal length, principal point, or both that were previously used for a calibration; wherein the parameters are different from image to image of the autofocus camera; wherein the parameters are determined by using an over-determined linear system; wherein the parameters are determined by minimizing a rectification error equation; wherein the error equations are placed in matrix multiplication form with the parameter variables to be determined. The lens shift correction unit also may be provided to:

establish at least two epipolar lines each extending from a corresponding point of a misplaced point and from an image of a non-autofocus camera, and extending to the image of the autofocus camera, wherein the intersection of the epipolar lines on the image of the autofocus camera is the correct position of the misplaced point; determine a distance from the misplaced point to each of the epipolar lines on the image of the autofocus camera; and use the distances to compute at least one of the shift parameters; wherein the cameras are in a non-collinear arrangement; wherein the shift parameters include a 2D displacement in a direction substantially parallel to a plane of a sensor of the autofocus camera, or scale substantially in a direction of the optical axis of the autofocus camera. The lens shift correction unit is to at least one of: warp rectified images of the autofocus camera with the parameters; and warp unrectified high resolution images of the autofocus camera with the parameters.

By another implementation, a computer-readable medium having stored thereon instructions that when executed cause a computing device to: obtain image data of multiple cameras wherein at least one of the cameras is to perform autofocus; determine shift parameters to shift the position of misplaced points of individual images of the autofocus camera and to correct positions determined by using corresponding points on images of non-autofocus cameras of the multiple cameras; and warp the images from the autofocus camera by using the parameters to modify the positions of the misplaced points on the images of the autofocus camera.

By yet another implementation, the instructions may cause the computing device so that wherein the shift parameters indicate a correction to the misplaced points as if the misplaced points were positioned by using a focal length, principal point, or both that were previously used for a calibration; wherein the parameters are different from image to image of the autofocus camera; wherein the parameters are determined by using an over-determined linear system; wherein the parameters are determined by minimizing a rectification error equation; and wherein the error equations are placed in matrix multiplication form with the parameter variables to be determined. The instructions may cause the computing device to: establish at least two epipolar lines each extending from a corresponding point of a misplaced point and from an image of a non-autofocus camera, and extending to the image of the autofocus camera, wherein the intersection of the epipolar lines on the image of the autofocus camera is the correct position of the misplaced point; determine a distance from the misplaced point to each of the epipolar lines on the image of the autofocus camera; and use the distances to compute at least one of the shift parameters; wherein the cameras are in a non-collinear arrangement; and wherein the shift parameters include a 2D displacement in a direction substantially parallel to a plane of a sensor of the autofocus camera, or scale substantially in a direction of the optical axis of the autofocus camera. The instructions also may cause the computing device to at least one of: warp rectified images of the autofocus camera with the parameters; and warp unrectified high resolution images of the autofocus camera with the parameters.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:

1. A computer-implemented method of lens shift correction for a camera array comprising:
   obtaining image data of multiple cameras wherein at least one of the cameras is to perform autofocus;
   determining shift parameters to shift the position of misplaced points of individual images of the autofocus camera and to correct positions determined by using corresponding points on images of non-autofocus cameras of the multiple cameras;
   warping the images from the autofocus camera by using the parameters to modify the positions of the misplaced points on the images of the autofocus camera; and
   establishing at least two epipolar lines each extending from a corresponding point of a misplaced point and from an image of a non-autofocus camera, and extending to the image of the autofocus camera, wherein the intersection of the epipolar lines on the image of the autofocus camera is the correct position of the misplaced point.

2. The method of claim 1 wherein the shift parameters indicate a correction to the misplaced points as if the misplaced points were positioned by using a focal length, principal point, or both that were previously used for a calibration.

3. The method of claim 1 wherein the parameters are different from image to image of the autofocus camera.

4. The method of claim 1 wherein the parameters are determined by using an over-determined linear system.

5. The method of claim 1 wherein the parameters are determined by minimizing a rectification error equation.

6. The method of claim 5 wherein the error equations are placed in matrix multiplication form with the parameter variables to be determined.

7. The method of claim 1 comprising determining a distance from the misplaced point to each of the epipolar lines on the image of the autofocus camera; and
   using the distances to compute at least one of the shift parameters.

8. The method of claim 1 wherein the cameras are in a non-collinear arrangement.

9. The method of claim 1 wherein the shift parameters include a 2D displacement in a direction substantially parallel to a plane of a sensor of the autofocus camera, or scale substantially in a direction of the optical axis of the autofocus camera.

10. The method of claim 1 comprising warping rectified images of the autofocus camera with the parameters.

11. The method of claim 1 comprising warping unrectified images of the autofocus camera and that have a resolution higher than the resolution of the images of the non-autofocus cameras, and warping with the parameters.

12. The method of claim 1 wherein the shift parameters indicate a correction to the misplaced points as if the misplaced points were positioned by using a focal length, principal point, or both that were previously used for a calibration;
   wherein the parameters are different from image to image of the autofocus camera;
   wherein the parameters are determined by using an over-determined linear system;
   wherein the parameters are determined by minimizing a rectification error equation;
   wherein the error equations are placed in matrix multiplication form with the parameter variables to be determined;
   the method of comprising:
      determining a distance from the misplaced point to each of the epipolar lines on the image of the autofocus camera; and
      using the distances to compute at least one of the shift parameters;
   wherein the cameras are in a non-collinear arrangement;
   wherein the shift parameters include a 2D displacement in a direction substantially parallel to a plane of a sensor of the autofocus camera, or scale substantially in a direction of the optical axis of the autofocus camera;
   the method comprising at least one of:
      warping rectified images of the autofocus camera with the parameters; and
      warping unrectified images of the autofocus camera and that have a resolution higher than the resolution of the images of the non-autofocus cameras, and warping with the parameters.

13. A computer-implemented system of lens shift correction, comprising:
   a display;
   at least one processor communicatively coupled to the display;
   at least one memory communicatively coupled to at least one processor; and
   a lens shift correction unit operated by the processor and to:
      obtain image data of multiple cameras wherein at least one of the cameras is to perform autofocus;
      determine shift parameters to shift the position of misplaced points of individual images of the autofocus camera and to correct positions determined by using corresponding points on images of non-autofocus cameras of the multiple cameras;
      warp the images from the autofocus camera by using the parameters to modify the positions of the misplaced points on the images of the autofocus camera; and
      establish at least two epipolar lines each extending from a corresponding point of a misplaced point and from an image of a non-autofocus camera, and extending to the image of the autofocus camera, wherein the intersection of the epipolar lines on the image of the autofocus camera is the correct position of the misplaced point.

14. The system of claim 13 wherein the shift parameters indicate a correction to the misplaced points as if the misplaced points were positioned by using a focal length, principal point, or both that were previously used for a calibration.

15. The system of claim 13 wherein the parameters are different from image to image of the autofocus camera.

16. The system of claim 13 wherein the parameters are determined by using an over-determined linear system.

17. The system of claim 13 wherein the parameters are determined by minimizing a rectification error equation.

18. The system of claim 13 wherein the lens shift correction unit is to determine a distance from the misplaced point to each of the epipolar lines on the image of the autofocus camera; and
   use the distances to compute at least one of the shift parameters.

19. The system of claim 13 wherein the cameras are in a non-collinear arrangement.

20. The system of claim 13 wherein the shift parameters include a 2D displacement in a direction substantially parallel to a plane of a sensor of the autofocus camera, or scale substantially in a direction of the optical axis of the autofocus camera.

21. The system of claim 13 wherein the shift parameters indicate a correction to the misplaced points as if the misplaced points were positioned by using a focal length, principal point, or both that were previously used for a calibration;
   wherein the parameters are different from image to image of the autofocus camera;
   wherein the parameters are determined by using an over-determined linear system;
   wherein the parameters are determined by minimizing a rectification error equation;
   wherein the error equations are placed in matrix multiplication form with the parameter variables to be determined;
   wherein the lens shift correction unit is to:
      determine a distance from the misplaced point to each of the epipolar lines on the image of the autofocus camera; and
      use the distances to compute at least one of the shift parameters;
   wherein the cameras are in a non-collinear arrangement;
   wherein the shift parameters include a 2D displacement in a direction substantially parallel to a plane of a sensor of the autofocus camera, or scale substantially in a direction of the optical axis of the autofocus camera;
   wherein the lens shift correction unit is to at least one of:
      warp rectified images of the autofocus camera with the parameters; and
      warping unrectified images of the autofocus camera and that have a resolution higher than the resolution of the images of the non-autofocus cameras, and warping with the parameters.

22. A non-transitory computer-readable medium having stored thereon instructions that when executed cause a computing device to:
   obtain image data of multiple cameras wherein at least one of the cameras is to perform autofocus;
   determine shift parameters to shift the position of misplaced points of individual images of the autofocus camera and to correct positions determined by using corresponding points on images of non-autofocus cameras of the multiple cameras;
   warp the images from the autofocus camera by using the parameters to modify the positions of the misplaced points on the images of the autofocus camera; and
   establish at least two epipolar lines each extending from a corresponding point of a misplaced point and from an image of a non-autofocus camera, and extending to the image of the autofocus camera, wherein the intersection of the epipolar lines on the image of the autofocus camera is the correct position of the misplaced point.

23. The medium of claim 22 wherein the shift parameters indicate a correction to the misplaced points as if the misplaced points were positioned by using a focal length, principal point, or both that were previously used for a calibration;
   wherein the parameters are different from image to image of the autofocus camera;
   wherein the parameters are determined by using an over-determined linear system;
   wherein the parameters are determined by minimizing a rectification error equation;
   wherein the error equations are placed in matrix multiplication form with the parameter variables to be determined;
   wherein the instructions cause the computing device to:
     determine a distance from the misplaced point to each of the epipolar lines on the image of the autofocus camera; and
     use the distances to compute at least one of the shift parameters;
   wherein the cameras are in a non-collinear arrangement;
   wherein the shift parameters include a 2D displacement in a direction substantially parallel to a plane of a sensor of the autofocus camera, or scale substantially in a direction of the optical axis of the autofocus camera;
   wherein the instructions cause the computing device to at least one of:
     warp rectified images of the autofocus camera with the parameters; and
     warping unrectified images of the autofocus camera and that have a resolution higher than the resolution of the images of the non-autofocus cameras, and warping with the parameters.

* * * * *